United States Patent
Krupkin et al.

(10) Patent No.: US 9,074,854 B2
(45) Date of Patent: Jul. 7, 2015

(54) COUNTERMEASURE SYSTEM (71) Applicant: Active Air Ltd., Modiin (IL)

(72) Inventors: Vladimir Krupkin, Rishon Lezion (IL); Shay Shlomi Alagem, Nes-Ziona (IL)

(73) Assignee: ACTIVE AIR LTD., Modin (IL)

( * ) Notice: Subject to any disclaimer, the term of this patent is extended or adjusted under 35 U.S.C. 154(b) by 34 days.

(21) Appl. No.: 13/916,830

(22) Filed: Jun. 13, 2013

(65) Prior Publication Data

US 2014/0368814 A1 Dec. 18, 2014

(51) Int. Cl.
- *F41H 11/02* (2006.01)
- *G01S 7/495* (2006.01)
- *F41G 7/22* (2006.01)
- *F41H 13/00* (2006.01)

(52) U.S. Cl.
CPC ............... *F41H 11/02* (2013.01); *G01S 7/495* (2013.01); *F41G 7/224* (2013.01); *F41H 13/0056* (2013.01)

(58) Field of Classification Search
CPC ............. G01C 21/02; G01C 3/08; G01J 5/02; G01B 11/26
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,600,434 A | 2/1997 | Warm et al. | |
| 6,410,897 B1 * | 6/2002 | O'Neill | 250/203.6 |
| 2009/0260511 A1 | 10/2009 | Melnychuk et al. | |
| 2011/0084195 A1 | 4/2011 | Schaub et al. | |
| 2012/0175418 A1 | 7/2012 | Jones | |

FOREIGN PATENT DOCUMENTS

| | | |
|---|---|---|
| DE | 9417451 | 6/1995 |
| EP | 1455199 | 9/2004 |
| WO | WO2004036269 | 4/2004 |
| WO | WO2006083278 | 8/2006 |
| WO | WO2008062401 | 5/2008 |
| WO | WO2011084195 | 7/2011 |

OTHER PUBLICATIONS

European Search Report from European Application No. EP 13172484 completed Nov. 27, 2013.

* cited by examiner

*Primary Examiner* — Luke Ratcliffe
(74) *Attorney, Agent, or Firm* — Dorsey & Whitney LLP (57) ABSTRACT

A countermeasure system for protecting a target against a threat comprising a sensing system including a first sensor(s) for detecting a threat within a wide-angle sector and producing a first directional signal indicative of a first angular zone of the threat location, and a second sensor(s) for detecting the threat within a narrow-angle sector narrower than the wide angle sector and for producing a second directional signal indicative of a relatively narrower second angular zone of the threat location; an illumination source for emitting a beam for neutralizing a threat; a controller for receiving signals from the sensors and for outputting tracking signals; a drive arrangement for moving the second sensor responsive to the first tracking signal to orient the second sensor to face towards the first zone, and beam directing means for directing the beam from the illumination source towards the second zone based on the second tracking signal.

22 Claims, 11 Drawing Sheets

COUNTERMEASURE SYSTEM

TECHNICAL FIELD

Embodiments of the invention relate to countermeasure systems for protecting a target from an incoming threat, in particular, a countermeasure system configured for neutralizing such a threat by illuminating it with an electromagnetic radiation in a suitable range of wavelengths.

BACKGROUND

It is well known in the field of defense to use countermeasure systems for protecting a target from an incoming projectile. In particular, when the incoming projectile is a guided missile, it is known to use countermeasure systems which are configured for disrupting the navigational, guiding or telemetry facility of either the missile or the sight guiding the same.

There are also known countermeasure systems comprising a variety of sensing elements configured for discovering an approaching missile, and an illumination system (NIR, UV, etc.) configured for neutralizing the missile by illuminating it with an electromagnetic radiation in a suitable range of wavelengths.

There are further known countermeasure systems in which the illumination system is mounted onto a platform which is capable of rotation and/or linear displacement and is configured for directing the system's illumination beam towards the threat, based on information from the sensing elements.

There are many hundreds of thousands of antitank guided missiles (ATGMs) worldwide. A significant part of ATGMs are in the hands of terrorists, presenting danger to civilians and law enforcement. ATGMs are relatively simple to use, they have high hitting probability and high destruction power. ATGMs were used and can be used against tanks, armored personnel carriers (APC), busses, trains, other vehicles, low flying aircrafts, troops, posts, buildings, bridges, fuel stations, oil installations, airports, and many other strategic objects and platforms. Protection against ATGMs requires very complicated and expensive equipment, because there are several types (generations) of different ATGMs operating according different guiding concepts.

There are attempts to protect objects using various hard kill layers including, a reactive armor (a layer that explodes under impact of a missile and destroys it), using exploding projectiles that intercept and destroy incoming missiles, and using omnidirectional exploding cartridges, that destroy everything around the protected object, including the incoming missile.

As a result of limited budgets and to avoid collateral damage, many objects remain unprotected, and there are casualties each year from terrorists attacks by ATGMs. A low cost solution for protection against ATGMs without any collateral damage is required.

There are several generations of ATGMs. Most of the ATGMs are equipped with a control unit. The control unit includes an optical sight and means to transfer control signals to the missile. The optical sight includes at least one of the following channels: a visual channel (operating in the visible part of spectrum), an infrared channel (operating in the near infrared part of spectrum) and a thermal channel (operating in the far infrared part of spectrum).

First generation of ATGMs is based on guidance by manual commands from an operator. The operator sees the target and the missile, and guides the missile to the target by issuing direction corrective commands (using a joystick). The commands are transferred to the missile by a wire that connects the missile and the control unit. The missile will deviate from the correct path, and it will be deflected, if operator will not issue corrective commands during period of 1 second.

Second generation of ATGMs is based on automatic guidance of the missile. The missile indicates its location via emission of IR radiation backward towards the sight/control unit. The control unit detects the IR radiation and calculates deviation of the missile from the optical axis of the sight. The control unit issues a corrective signal, which is delivered to the missile. The optical sight shall be pointed on the target. Interruption of this process will result in missile deflection.

Second plus generation of ATGMs is also based on automatic guidance of the missile. The guidance method is so called laser beam riding. The sight/control unit emits a laser beam parallel to optical axis of the sight. The laser beam is directed to the target, when sight is pointed on the target. Laser beam sensor of the missile receive laser radiation from the sight/control unit, that is the sensor is directed backward the missile. The missile detects deviation of its position from the laser beam, and then it makes corrections to stay in the center of laser beam. It shall be noted that this generation of ATGMs can be fired from relatively long distances of more than 5 km, and that it takes a long time for the missile to fly to the target. The missile will deviate from the path to target, and it will be deflected, if operator will not keep sight on the target, or if the missile will not be able to detect the laser beam for some time for any reason including obscuration of the missile sensor, or if the missile sensor will be illuminated by a countermeasure laser jamming radiation.

Third generation of ATGMs is equipped with optical sensors on a basis of "fire and forget". The sensors can operate in visible, IR, NIR or FIR part of the spectrum. The sensors "see" the target. Operator shall bring the field of view of sensor on the target and lock the target to the missile. The missile will fly to the target automatically using signals from the optical sensors. Interruption of normal operation of the optical sensor will result in missile deflection.

SUMMARY

According to one aspect of the subject matter of the present application, there is provided a countermeasure system for protecting a target against a threat of a certain type, said system comprising:
  a sensing system including at least a first sensor configured for detecting a threat within a wide-angle sector and configured for producing a first directional signal indicative of a first angular zone of location of said threat, and a second sensor configured for detecting said threat within a narrow-angle sector narrower than said wide angle sector, and configured for producing a second directional signal indicative of a second angular zone of location of said threat, said second zone being narrower than said first zone;
  an illumination source configured for emitting an illumination beam capable of neutralizing a detected threat of said type;
  a control arrangement operative for receiving said first and said second directional signal from said first and said second sensors, respectively, and for outputting corresponding first and second tracking signals;
  a drive arrangement controllable by said control arrangement, and operative for moving said second sensor in response to said first tracking signal so as orient said second sensor to face towards said first zone; and
  beam directing means for directing said illumination beam from the illumination source towards said second zone based on said second tracking signal.

The drive arrangement can be in the form of a gimbal carrying said second sensor and, possibly, said beam directing means (with or without the illumination source) and constituting at least a part of said drive arrangement for the second sensor and, possibly, at least a part of said beam directing means. The arrangement can be such that a central axis of the second sensor and an optical axis of said illumination beam along which it is emitted from the system (i.e. an operative direction of the illumination beam), are oriented towards one area remote from said countermeasure system, the gimbal being rotatable about at least one rotary axis thereof so as to ensure that said area coincides with said second zone.

The gimbal can be a two axis gimbal configured for directing of optical head. It is a mechanical device that provides angles of rotation of 360 degrees in azimuth and 10 degrees to 90 degrees in elevation. It can be powerful enough to rotate the optical head from initial orientation to the desired orientation within less than 5 seconds. In particular, the gimbal can include two motors and two gears, two position sensors (for example encoders), and two mechanical interfaces for attachment of the gimbal to the platform and for attachment of the optical head to the gimbal.

Under the above arrangement, once the second sensor is directed towards the first zone based on said first tracking signal, the operative direction of the illumination beam is already facing in the proper direction for affecting the threat. Thus, only minor corrections, based on said second tracking signal, are required in order to bring the operative direction of the illumination source into exact positioning for affecting the threat.

Alternatively, the illumination source and/or the beam directing means can be movable relative to the gimbal to bring the illumination beam to the second zone, when required. In one example, the illumination source and/or the beam directing means can be movably mounted onto the gimbal and be configured to be displaced/rotated with respect to the gimbal by the drive arrangement.

The beam directing means of the countermeasure system can comprise a beam orientation device configured for directional deflection of the beam produced by the illumination source towards said threat. Specifically, the arrangement can be such that, regardless of where the illumination source is located, its illumination beam always impinges on the beam orientation device. The device can then be displaced/rotated/manipulated based on said second tracking signal so that the direction beam impinging thereon is deflected towards the second zone and the incoming threat.

The beam orientation device can include a mirror arrangement configured for receiving the directional beam and deflecting it, or it can be a prism arrangement under which the directional beam passes through at least one prism thereby being deflected in the proper direction.

In particular, the deflector can be a beam steering device which comprises a mirror or a pair of mirrors, tilted in two orthogonal directions. Various engines/actuators can be used to tilt the mirrors, for example piezo-electrical motors or galvanometric motors, or voice coil motors. Refractive deflectors can include a pair of optical wedges (Risley prisms). The wedges shall be rotated around optical axis to change deflection direction. In general, reflective deflectors are faster, and refractive deflectors are more accurate.

All the components of the countermeasure system or at least its gimbal can be mountable on a base platform (for example, a platform configured for carrying and displacing the system such as a vehicle). The first sensor can be either mountable on the platform separately from the gimbal or mounted on the gimbal, or mountable at a location external to the remainder of the countermeasure system and the platform.

The first sensor can be configured and/or movable so that the wide-angle sector has angular extension X1 in the range $0 < X1 \leq 360°$, and the first angular zone established by it can have an angular extension XZ1 up to 0.5X1, more particularly, up to 0.25X1, and still more particularly, up to 0.1X1. To achieve a desired angular extension X of the first sensor's wide-angle sector, the first sensor can be rotatable about an axis that can be parallel to or coincide with the rotary axis of the gimbal, thereby allowing the first sensor's rotary scanning of the surrounding space.

The first sensor can provide a field of view of 360 degrees in azimuth and about 10 degrees to 90 degrees in elevation.

The second sensor can be selected so that its narrow angle sector has an angular extension X2 that is at least not smaller than that of the first zone, i.e. $X2 \geq XZ1$. The relation between X2 and XZ1 can be, for example, $X2 \geq 1.1 XZ1$, more particularly $X2 \geq 1.4 XZ1$, even more particularly $X2 \geq 1.8 XZ1$ and still more particularly $X2 \geq 2 XZ1$.

The first zone and the narrow sector can have a respective first and second central axis, which divides them into two equal halves, so that when the first sensor determines within its field of view the first zone, in which the threat has been detected, moving the second sensor based on the first tracking signal such as to align the central axis of the narrow sector thereof with that of the first zone determined by the first sensor, will inevitably result in the second sensor's narrow sector including the threat therein. In other words, the above arrangement inevitably results in that, under any circumstance, the threat falls within the field of view of said second sensor.

The system can further include shock absorbers or dampeners configured for protecting the system, when mounted on the base platform, from mechanical and other damage during displacement of the platform. In particular, the arrangement can be such that the shock absorbers/dampeners have an angular degree of freedom about the axis of rotation of the gimbal chosen not to be greater than at least one of the following:

the angular extension of said first angular zone; and
the FOV of the second sensor.

The first sensor can be a wide warning receiver of any known type, e.g. a missile warning system (MWSW), and it can include a laser detector (i.e. be a wide laser warning receiver—WLWRW), a radar or an electro-optic system EOS. Under various design embodiments of the MWSW, the EOS can include at least one of a bolometric sensor, a UV sensor, a VIS sensor, a NIR sensor, a TV camera, an IR sensor, a SWIR sensor, a position sensitive device, or a matrix of photodiodes.

The detection range of the radar/EO can be up to 7 km. It is preferably up to 2 km to reduce cost. Detection range of the bolometric sensor can be up to 7 km. It is preferably up to 2 km to reduce cost.

The above described infra-red ranges should be understood as follows:

Near infrared light source can operate in the spectral range of 700 nm to 1100 nm. Preferred color of near infrared light source is in the range of 800 nm to 1000 nm, where sensitivity of near infrared sensors is high. Light sources in the range of 1500 nm-1700 nm have advantages of eye safety and of covert operation;

Far infrared light source can operate in the spectral range of 2 um to 20 um. Preferred color of far infrared light source is in the transparency windows of the atmosphere, at wavelengths about 2000 nm-5000 nm and 8000 nm-12000 nm. For example, far infrared source can be a carbon dioxide laser or a quantum cascade laser operating in the range of 10000 nm-11000 nm.

Light sources can be various gas lasers, electrically pumped semiconductor lasers, quantum cascade lasers, solid state lasers, optically pumped semiconductor lasers with frequency doubling, fiber lasers, optical parametric oscillators, light emitting diodes, lamps.

The second sensor can be a narrow warning receiver of any known type, and it can also include a laser detector (i.e. be a narrow laser warning receiver—NLWRN), a radar or an electro-optic system EOS. Under various design embodiments of the second sensor, the EOS can include at least one of a bolometric sensor, a UV sensor, a VIS sensor, a NIR sensor, a TV camera, an IR sensor, a SWIR sensor, a position sensitive device, or a matrix of photodiodes.

In accordance with a specific example, the narrow field of view sensor for detection of laser beam illumination can be located within a combined device using the same or common optics, detector and electronics.

In the above latter alternative, the illumination source of the countermeasure system can include a jammer device configured for producing a jammer signal which is effective for neutralizing specific types of threats.

It is appreciated that the countermeasure system is not limited to a single first sensor or to a single second sensor and can comprise a plurality of each of the sensors. For example, the system can comprise four first sensors, each sensor providing field of view of more than 90 degrees in azimuth. The system can also comprise several second sensors as well.

The illumination source can be configured to include a plurality of illumination emitting devices, each of which can be, for example, any one or more of the following:
  an NIR illuminator;
  an VIS illuminator;
  an FIR illuminator;
  a matrix of photodiodes;
  a gas laser;
  a solid state laser;
  a semiconductor laser;
  a fiber laser;
  a fiber coupled laser;
  a quantum cascade laser;
  an optically pumped semiconductor laser;
  an optical parametric oscillator;
  a second harmonic generator;
  a frequency doubler;
  a dye laser;
  a Raman laser;
  a light emitting diode; and
  a lamp Furthermore, the illumination source can be configured to include devices for emitting illumination at different parts of optical spectrum, e.g. visible, near infrared and far infrared part of the optical spectrum. The illumination source can be further configured so that all these devices can be operated simultaneously for emitting radiation in several parts of the spectrum at the same time.

Regardless of which arrangement is used for appropriately positioning the directional beam of the illumination source (via deflection or displacement together or separately from the gimbal), the directional beam can be configured for being directed to at least one of the following:
  the threat itself; and
  a sight of the threat.

In particular, when the threat is a laser beam rider and the sight provides the laser beam by which the threat is guided, the directional beam can be effective for disrupting the sight's operation, thereby preventing proper guiding of the threat and effectively neutralizing it.

In connection to the above, the following should also be considered:

Each light source can be configured to provide a sufficient radiant intensity to create a sufficient irradiance to saturate a corresponding channel of the sight. The required output power of light source can be proportional to the second order of output divergence of light source. Required output power increases very fast with increase of divergence and cost of light source increases as well. Small divergence allows keeping the output power and the cost of light low. However, since it is difficult to illuminate the sight with narrow light beam, and it is easy to miss the sight, the present countermeasure system allows knowing the direction to the sight with high accuracy and deflecting the light beam with high accuracy. Accurate direction to the sight is measured with narrow field of view laser beam receiver and with narrow field of view sensor for detection of retro reflections. Accurate direction to the missile is measured with narrow field of view thermal camera or FIR or UV sensors. Accurate laser beam deflection is provided with the 2 axis deflector or with precise circuits and mechanics of the gimbal.

Among light sources, the NIR source is least expensive. Divergence of this source is set large enough to illuminate the sight using low accuracy directions measured by panoramic sensors and using low accuracy aiming of the two axis gimbal. That brings the sight into field of view of narrow field of view sensors. They measure direction to the sight more accurately, allowing better pointing of light sources on the sight. Correspondingly, divergence of visible and far infrared light sources is reduced, and cost of the sources is relatively low. This provides relatively low cost of the countermeasure system.

The NIR source can include a narrow laser beam. The narrow laser beam can be used for illumination in direction of the missile.

According to another aspect of the subject matter of the present application, there is provided a method for protecting a target against a threat by affecting the threat by an illumination beam, the method including the steps of:
  detecting, using a first sensor, a wide zone indicative of an approximate location of said threat;
  outputting to a control arrangement a first directional signal indicative of said wide zone;
  providing, by the control arrangement, a first tracking signal to a drive arrangement corresponding to said first directional signal;
  directing a second sensor towards said wide zone based on said first tracking signal;
  detecting, using said second sensor, a narrow zone indicative of more accurate location of said threat, said narrow zone being narrower than said wide zone;
  outputting to the control arrangement a second directional signal corresponding to said second zone;
  providing, by the control arrangement, a second tracking signal to the drive arrangement corresponding to said second directional signal; and
  directing, based on said second tracking signal, said illumination beam towards said second zone to affect the threat.

It is noted that in the case of step (d), if central axis of the second sensor is aligned with optical axis of the illumination beam, performing step (d) results in bringing said illumination source in close proximity with direction towards said threat.

Regarding the arrangement of the illumination source and/or beam directing means previously described with respect to the countermeasure system, step (h) of the method can be performed by one of the following:

(h1) if the illumination source is fixedly mounted onto said gimbal—revolving the gimbal about at least one of its axes;

(h2) if the illumination source is movable with respect to the gimbal—moving/revolving the illumination source with respect to the gimbal; and (h3) if the countermeasure comprises a beam orientation device—moving/displacing the device.

The countermeasure system can also include a feature under which, if the countermeasure detects that it is unsuccessful in jamming/stopping/disrupting the threat, it can be configured for alerting the target to change its position with respect to its original position, thereby causing the threat to miss it. Alternatively, for moving targets, the system can alert the target to stop/not continue in its original route (direction of speed).

It is appreciated that the above countermeasure system can be employed not only in stationary structures (houses, buildings, bases, etc.) but also in mobile units such as land vehicles, marine vessels, aircrafts etc.

It is also appreciated that the countermeasure system provides protection against the above projectiles at a predetermined range. Hence, for large structures/units, it may be required to provide several such countermeasure systems which are spread across the area of the structure/unit. Alternatively, an arrangement can be provided for displacing at least one countermeasure system along the structure/unit in order to provide proper coverage.

As a particular example, while the countermeasure system can singly be used to successfully protect a vehicle (e.g. ATV), for marine vessels such as a ship, several such countermeasure systems can be used.

BRIEF DESCRIPTION OF THE DRAWINGS

In order to understand the subject matter of the present application and to see how it can be carried out in practice, at least one embodiment will now be described, by way of non-limiting example only, with reference to the accompanying drawings, in which.

DETAILED DESCRIPTION OF THE DRAWINGS

Figure 1:
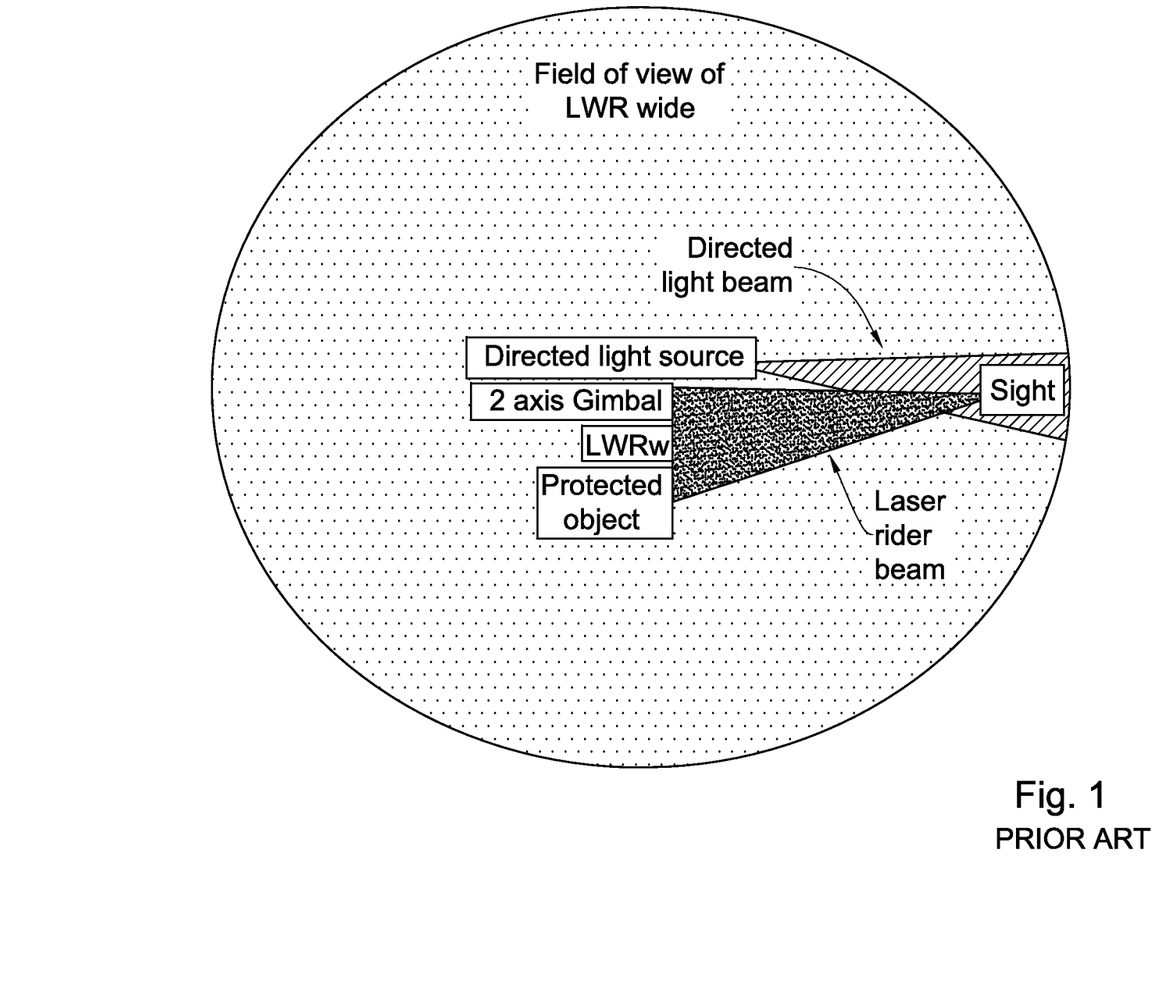
FIG. 1 is a schematic top view of an interposition of the countermeasure system according to prior art, including a sight, a threat commanded by the sight and an object to be protected from the threat by the system, shown during a first stage of operation of the system.

Attention is first drawn to FIG. 1A which represents a countermeasure system according to the prior art. It comprises a gimbal and a wide Laser Warning Receiver ($LWR_W$). The $LWR_W$ has a field of view of 360° and is configured for detecting an incoming missile and to disable the missile using appropriate illumination.

Figure 2A:
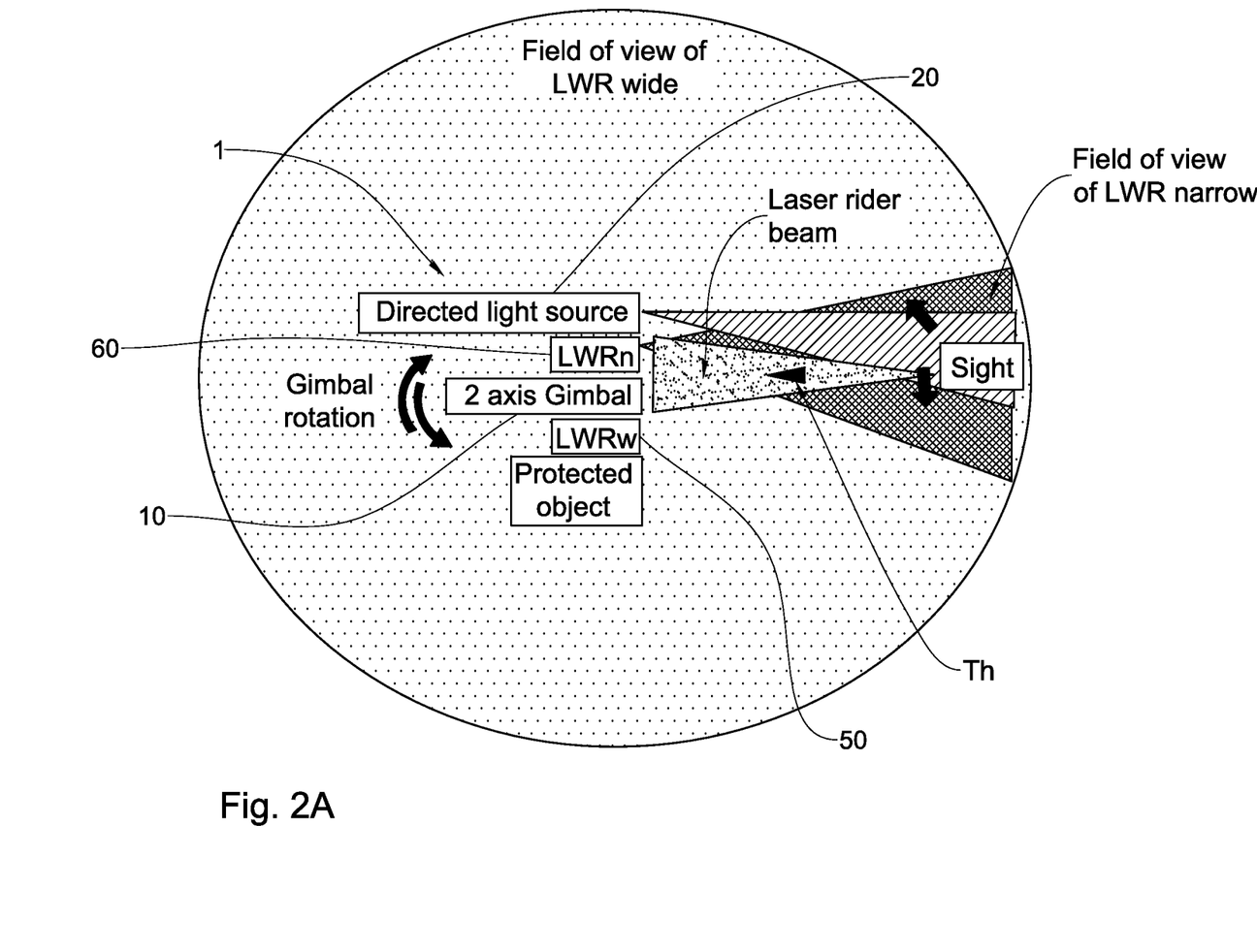
FIG. 2A is a schematic top view of the interposition shown in FIG. 1A during a second stage of operation of the countermeasure system.
Figure 2B:
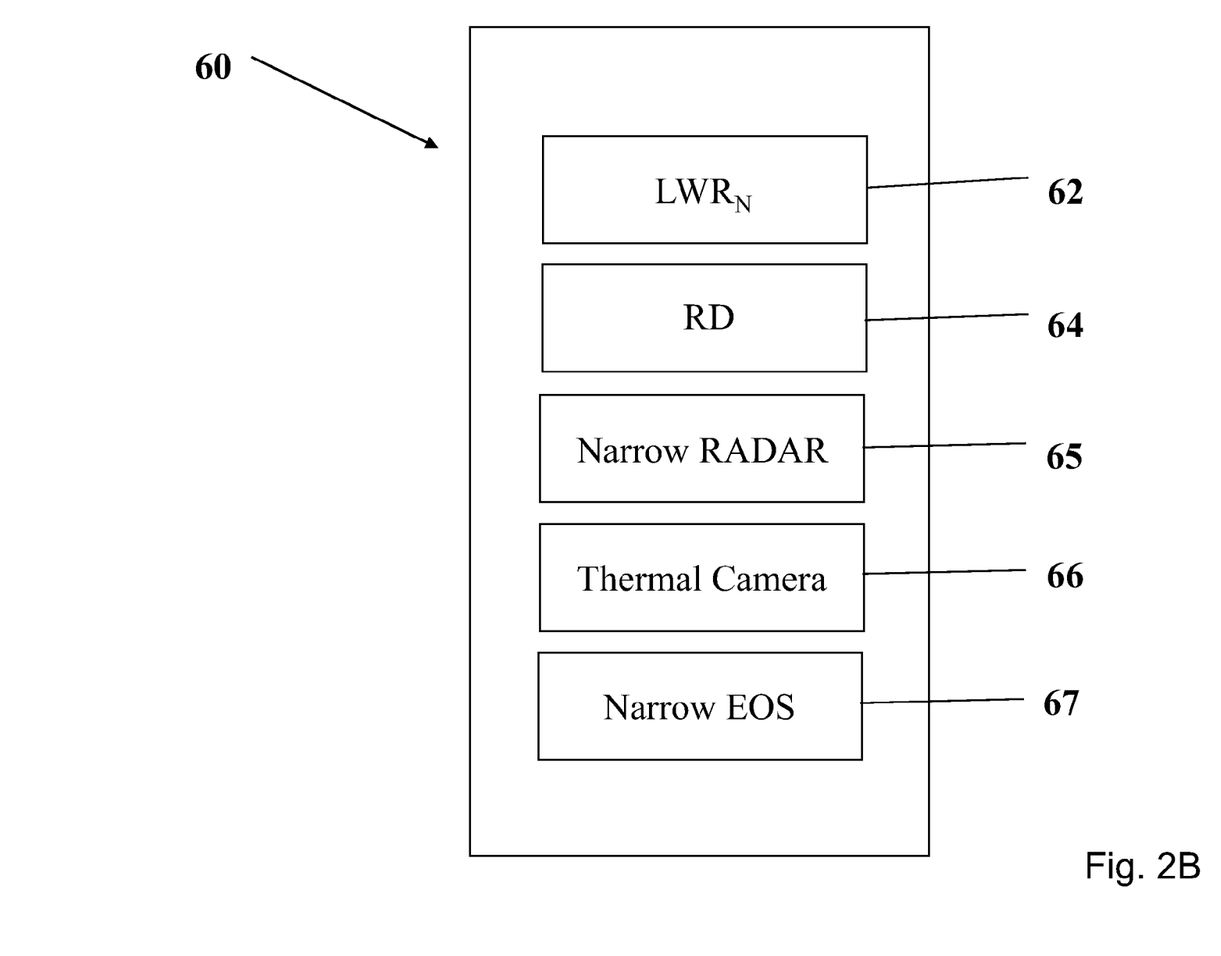
FIG. 2B is a schematic block diagram representation of a sensor arrangement used in the system shown in FIG. 2A.

Attention is then drawn to FIGS. 2A and 2B in which a countermeasure system according to the subject matter of the present application is shown, generally being designated as 1, and comprising:

an operational station including:
a two-axes gimbal 10;
an illumination source system 20
a control arrangement 30 (shown in FIG. 4B); and
a drive arrangement 40 (shown in FIG. 4B);
a first, wide field of view sensor arrangement 50 having a wide field of view; and
a second, narrow field of view sensor arrangement 60 having a narrow field of view.

In particular, the first sensor 50 is configured for detecting a threat within a wide-angle sector and configured for producing a first directional signal indicative of a first angular zone of location of the threat, and the second sensor is configured for detecting the threat within a narrow-angle sector narrower than the wide angle sector, and configured for producing a second directional signal indicative of a second angular zone of location of the threat, the second zone being narrower than the first zone;

The illumination source 20 is configured for emitting an illumination beam in various ranges of the electromagnetic spectrum capable of neutralizing an incoming threat of a given type;

The control arrangement 30 is operative for receiving the first and the second directional signal from the first and the second sensors 50, 60, respectively, and for outputting corresponding first and second tracking signals to the drive arrangement 40.

The drive arrangement 40, being controllable by the control arrangement, is operative for moving the second sensor 60 in response to the first tracking signal so as orient the second sensor 60 to face towards the first zone.

The system 1 can also comprise beam directing means for directing the illumination beam from the illumination source towards the second zone based on the second tracking signal.

The gimbal 10 is configured for carrying the second sensor 60 and, possibly, the beam directing means (with or without the illumination source) and constituting at least a part of the drive arrangement for the second sensor and, possibly, at least a part of the beam directing means. The arrangement can be such that a central axis of the second sensor and an optical axis of the illumination beam along which it is emitted from the system (i.e. an operative direction of the illumination beam), are oriented towards one area remote from the countermeasure system, the gimbal being rotatable about at least one rotary axis thereof so as to ensure that the area coincides with the second zone.

It is appreciated that the first sensor 50 can cover a wide sector of 360° angle and at a range of R while the second sensor 60 can cover a second, narrower sector of about 3-5° at a range of r. The ranges R and r are measured with respect to a circle at the center of which the operational station 10 of the system is positioned. It is appreciated that the cost of a sensor is affected, inter alia, by the range thereof and by the accuracy thereof (i.e. its indicated detection zone). Therefore, the above arrangement allows utilizing a combination of sensors where one is of lower accuracy but higher range and vice versa.

Under the above arrangement, once the second sensor is directed towards the first zone based on the first tracking signal, the operative direction of the illumination beam is already facing in the proper direction for affecting the threat. Thus, only minor corrections, based on the second tracking signal, are required in order to bring the operative direction of the illumination source into exact positioning for affecting the threat.

Alternatively, the illumination source and/or the beam directing means can be movable relative to the gimbal to bring the illumination beam to the second zone, when required. Under one example, the illumination source and/or the beam directing means can be movably mounted onto the gimbal and be configured to be displaced/rotated with respect to the gimbal by the drive arrangement.

With further reference to FIGS. 2A and 2B, a threat Th is shown being launched from a sight S and incoming towards a target Ta (not shown) located in the vicinity of the countermeasure system 1.

In construction, the first sensor 50, due to its wide field of view, can be located at various positions at the vicinity of the target Ta. To the contrary, the second sensor 60 is mounted onto the gimbal 10 and is configured for revolving therewith.

The first sensor can be configured and/or movable so that the wide-angle sector has angular extension $X_1$ in the range $0 < X_1 \leq 360°$, and the first angular zone established by it can have an angular extension $X_{Z1}$ up to $0.5X_1$, more particularly, up to $0.25X_1$, and still more particularly, up to $0.1X_1$. To achieve a desired angular extension X of the first sensor's wide-angle sector, the first sensor 50 can be rotatable about an axis that can be parallel to or coincide with the rotary axis of the gimbal 10, thereby allowing the first sensor's rotary scanning of the surrounding space.

The second sensor 60 can be selected so that its narrow angle sector has an angular extension $X_2$ that is at least not smaller than that of the first zone, i.e. $X_2 \geq X_{Z1}$. The relation between $X_2$ and $X_{Z1}$ can be, for example, $X_{2} \geq 1.1 X_{Z1}$, more particularly $X_2 \geq 1.4 X_{Z1}$, even more particularly $X_2 \geq 1.8 X_{Z1}$ and still more particularly $X_2 \geq 2 X_{Z1}$.

The first zone and the narrow sector can have a respective first and second central axis, which divides them into two equal halves, so that when the first sensor determines within its field of view the first zone, in which the threat has been detected, moving the second sensor based on the first tracking signal such as to align the central axis of the narrow sector thereof with that of the first zone determined by the first sensor, will inevitably result in the second sensor's narrow sector including the threat therein. In other words, the above arrangement inevitably results in that, under any circumstance, the threat falls within the field of view of the second sensor.

With reference to the above, as the countermeasure system does not initially know which threat it will be faced with, each of the sensor arrangements 50, 60 is equipped with multiple sensors for covering the majority of threats which are expected against the protected object.

In particular, the first sensor unit comprises a wide laser warning receiver ($LWR_W$) 52 and a wide missile warning receiver ($MWS_W$) 54, the former being suitable for detecting Gen 2+ missiles while the latter is suitable for detection of Gen 1, Gen 2 and Gen 3 missiles. With particular reference to FIG. 2B, the second sensor unit 60 is also equipped with various sensors, specifically, a narrow laser warning receiver ($LWR_N$) 62 and an RD sensor 64, a narrow Radar 65, a thermal camera 66 and/or other narrow EOS 67.

The illumination source system 20 is also equipped with a plurality of illumination sources in a plurality of illumination spectrum ranges, configured for illumination and neutralization of various types of threats.

The operation of the countermeasure system 1 will now be described with specific reference to FIG. 2B:

When the $LWR_W$ 52 detects an incoming threat (in the present case laser beam rider missile controlled by a sight S), it outputs a first directional signal to the control arrangement 30 which, in turn, generates a first tracking signal configured for instructing the drive arrangement to rotate the gimbal 10 in the general direction of the threat Th.

As a result of rotation of the gimbal 10, the second sensor 60 is now generally aligned with the threat Th, and can detect its position in a more accurate manner. It is noted that one of the advantages of such an arrangement lies in the fact that it eliminates the need to use the second sensor 60 as the single sensor (instead of the first, wide field of view sensor 50), while providing essentially the same accuracy in detecting an incoming threat.

According to a specific example of the countermeasure system S, the illumination source 20 is also mounted onto the gimbal 10, and the direction of its beam is aligned with the direction of the second sensor 60. In this manner, when the second sensor 60 is aligned with the threat Th based on the first tracking signal, the beam of the illumination source 20 is also aligned with the threat, requiring only very minor adjustments for reaching maximal accuracy.

Furthermore, the arrangement can be such that the first, wide field of view sensor 50 has an error margin of about 3-4°, i.e. an error margin which is smaller than the view angle of the second sensor 60 (about) 3-5°. As a result, when the first sensor 50 detects the threat Th and the gimbal 10 is revolved towards it, the second sensor 60 will inevitably be directed such that its detection angle encompasses the threat Th.

Thereafter, upon detection by the $LWR_N$ 62 of the second sensor unit 60, the latter outputs a second directional signal to the control arrangement 40 which, in turn, generates a second tracking signal configured for instructing the drive arrangement to rotatably adjust the a directional beam of the illumination source 20 towards the updated direction of the threat Th.

Once the gimbal 10 and the illumination source are properly oriented with respect to the incoming threat based on the second tracking signal, the illumination source begins illuminating the threat by VIS and FIR radiation. As far as the sight of the threat is located behind the missile along the direction from the target to the missile, the sight is also illuminated by VIS and FIR radiation. As a result of the above, the sight operation is disturbed; the missile is neutralized and misses the target Ta.

Figure 2C:
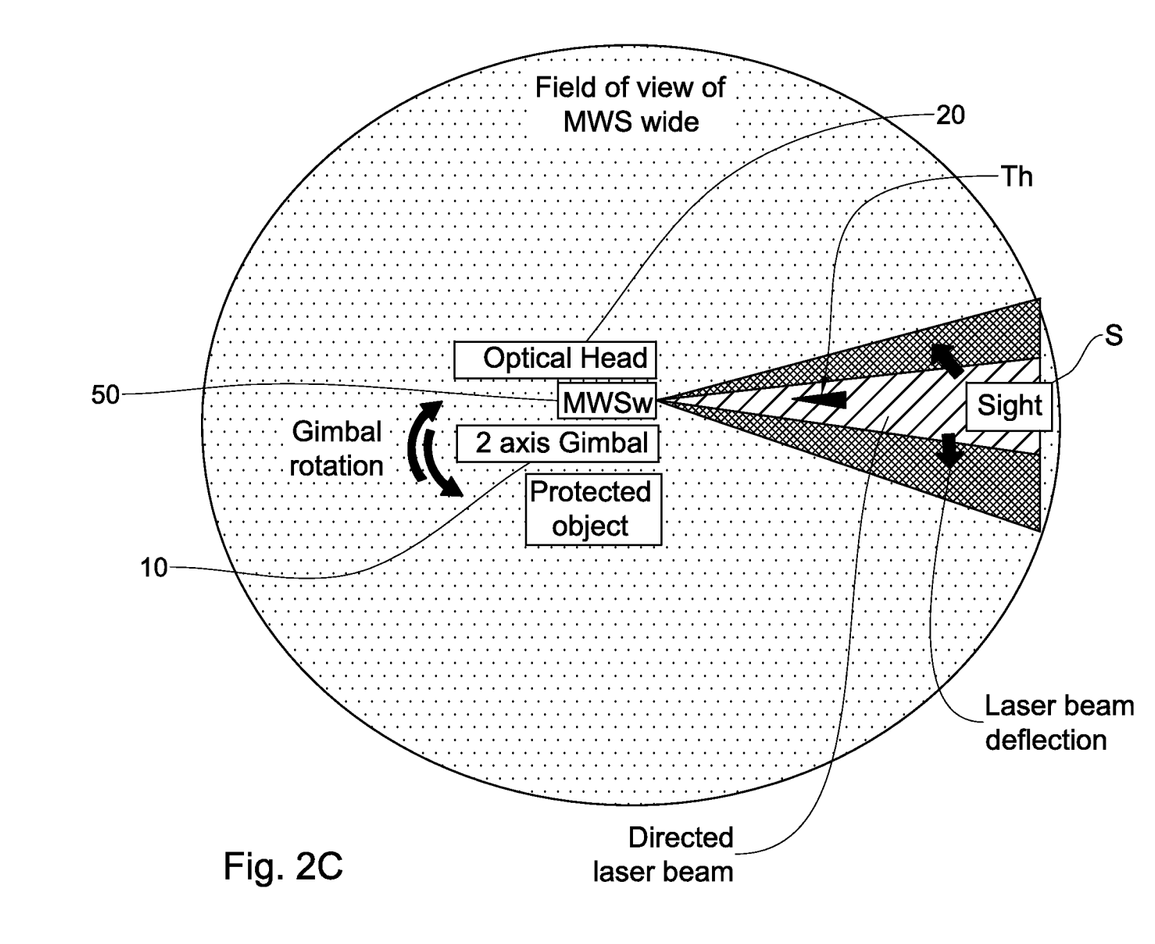
FIG. 2C is a schematic top view of the interposition shown in FIG. 1A, when dealing with a threat of a different type, shown during a first stage of operation thereof.
Figure 2D:
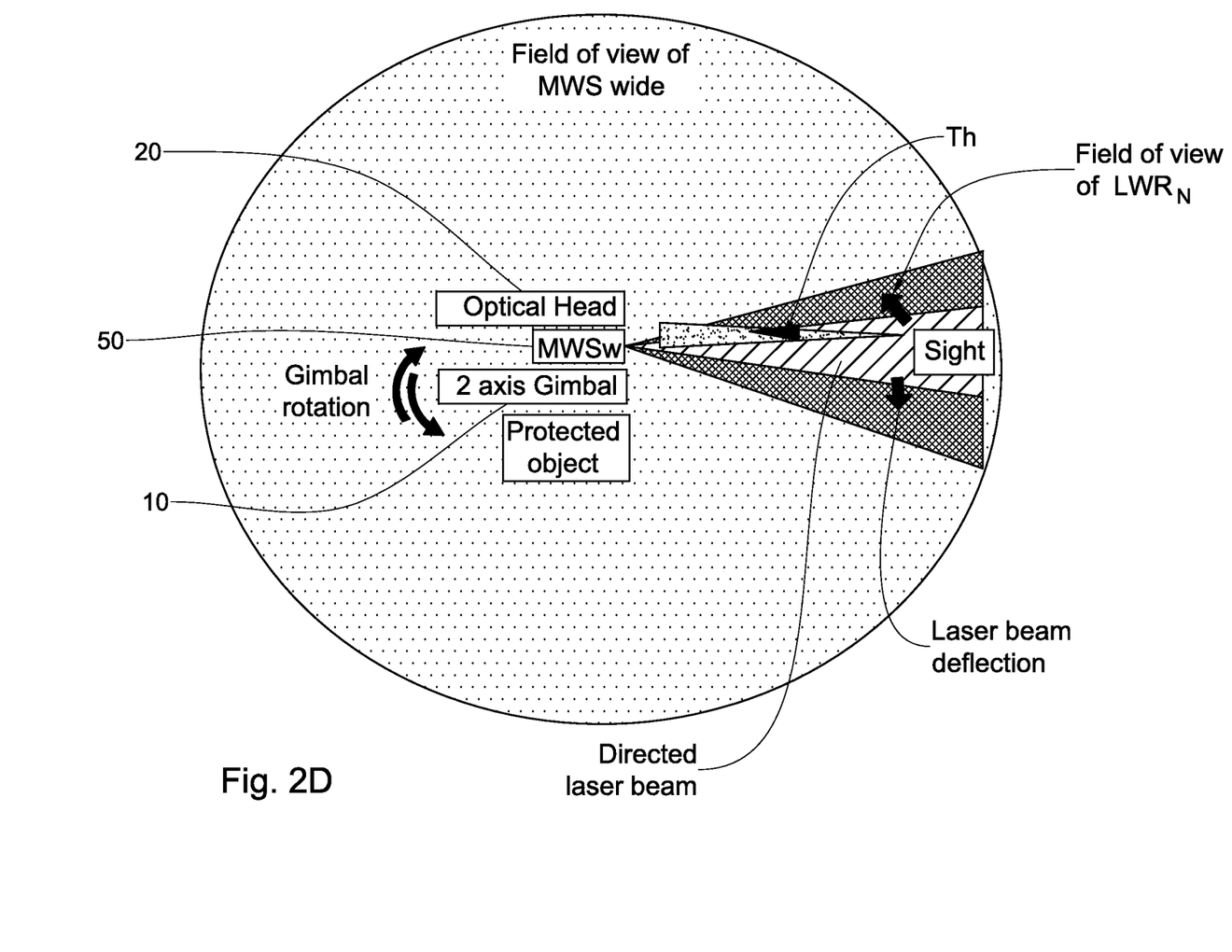
FIG. 2D is a schematic top view of the interposition shown in FIG. 1C during a second stage of operation of the countermeasure system.

Turning now to FIGS. 2C and 2D, the operation of the system will now be explained in the event that a Gen 1, 2 or 3 missiles is directed at the object to be protected.

When the $MWS_W$ 54 detects an incoming threat it outputs a first directional signal to the control arrangement 30 which, in turn, generates a first tracking signal configured for instructing the drive arrangement to rotate the gimbal 10 in the general direction of the threat Th.

Thereafter, the threat Th and its launch station (sight) are illuminated by a jammer signal based on Near Infra-Red (NIR) radiation.

It is appreciated that in both cases, once the illumination source is turned on, it emits intense light towards the sight, saturating vision of the operator. The effect is similar to saturation of vision by bright sun light. The operator cannot see the target using visible channel of the sight. The NIR light source saturate TV channel, if it exists in the sight. No image of the target is available on the TV channel screen. The FIR source saturates thermal channel. No thermal image of the target is available on the thermal channel screen. The operator cannot see the target using all available to him equipment, and he misses the target. It is possible that the missile will be deflected at a long distance, even before entering into detection range of MWRw. The laser jammer emits NIR radiation in the same direction. As a result, the missile is deflected.

A similar operation is performed when no LWRw detection occurs, but MWRw detects a missile. The optical head is pointed towards the missile, and a signal from LWRn is verified. If no detection by LWRn occurs, that indicates that the missile is not a laser beam rider. All light sources are then switched on. The missile is illuminated by powerful light, and the area behind the missile is illuminated as well. The sight is situated behind the missile, so it is also illuminated by the light sources. The visible channel, the TV channel and the thermal channel of the sight becomes saturated, and the operator cannot keep aiming the sight on the target, thus missing it.

When both the missile and the sight are detected, the illumination source 10 is accurately aligned and directed towards the threat Th and towards the sight in a sequence, illuminating one after another. When multiple threats are detected, the illumination source 10 is accurately aligned and directed towards each threat Th and towards each sight in a sequence.

The term 'in sequence' refers to applying the method of detection and countermeasure in alternating order to one threat and then to the other. In case a sight and a threat are concerned, countermeasure will affect the position of the threat, thereby indicating which is the threat and which is the sight.

The time frame of operation is approx. 0.5 sec. for operating the countermeasure means while it can take approx. 5-15 sec. for the threat to reach the target from the moment of detection—depending on the detection system.

Figure 3A:
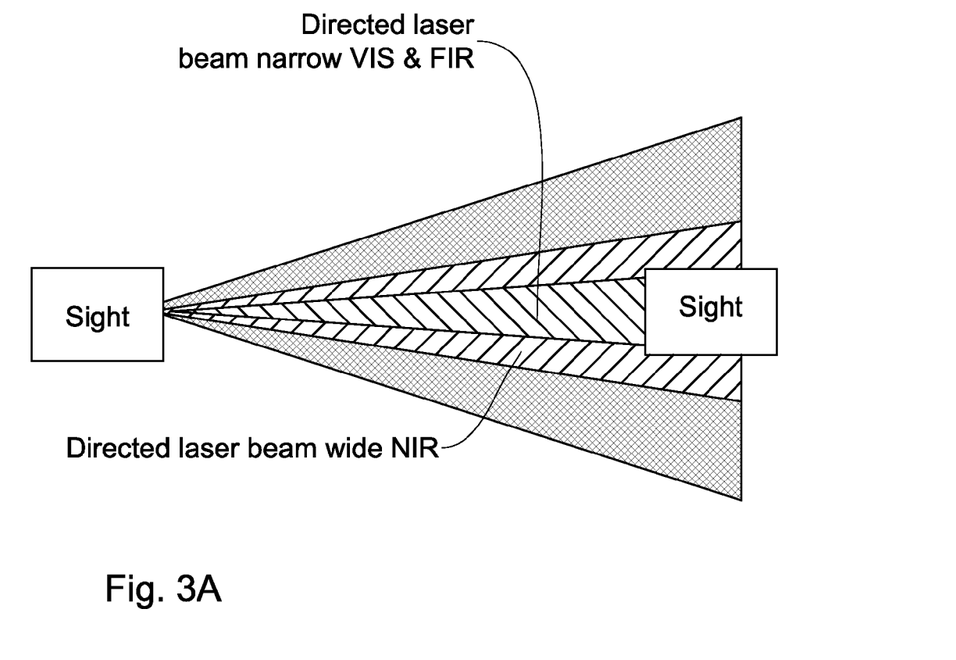
FIGS. 3A and 3B are schematic interpositions of the object to be protected and of the sight when the latter is exposed to the directed illumination source of the countermeasure system during two respective stages of operation thereof.
Figure 3B:
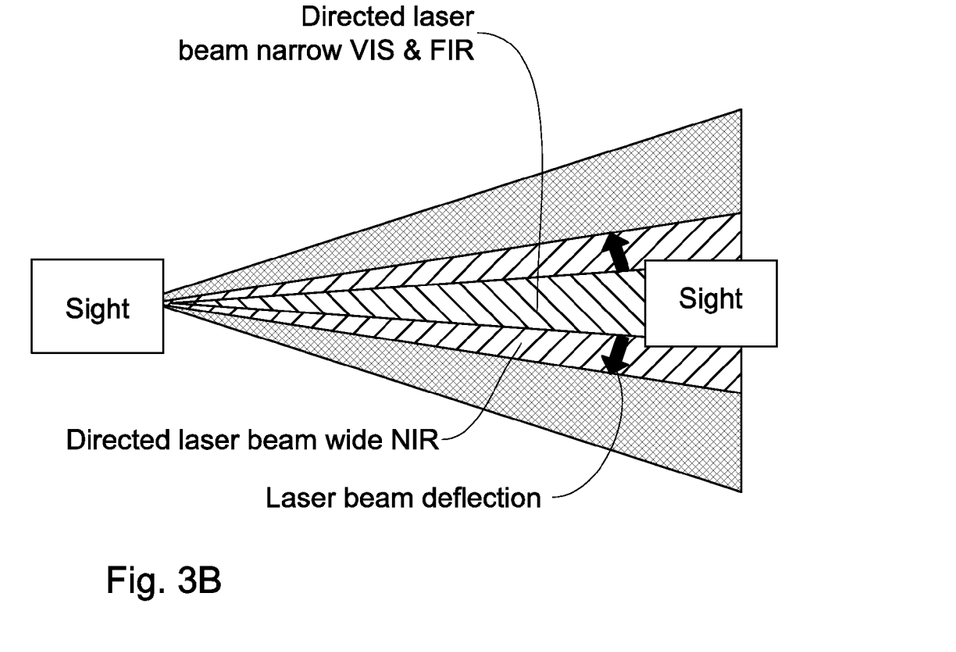

Turning now to FIGS. 3A and 3B, the system 1 is shown during operation when illuminating a sight of a threat. In FIG. 3B, as opposed to FIG. 3A, directed laser beams of visible light (VIS) and far infra-red (FIR) are used for the retro detection reflected off the sight. In particular, in FIG. 3B the beams are deflected or scanned over and extended angle to ensure illumination of the sight.

Figure 4A:
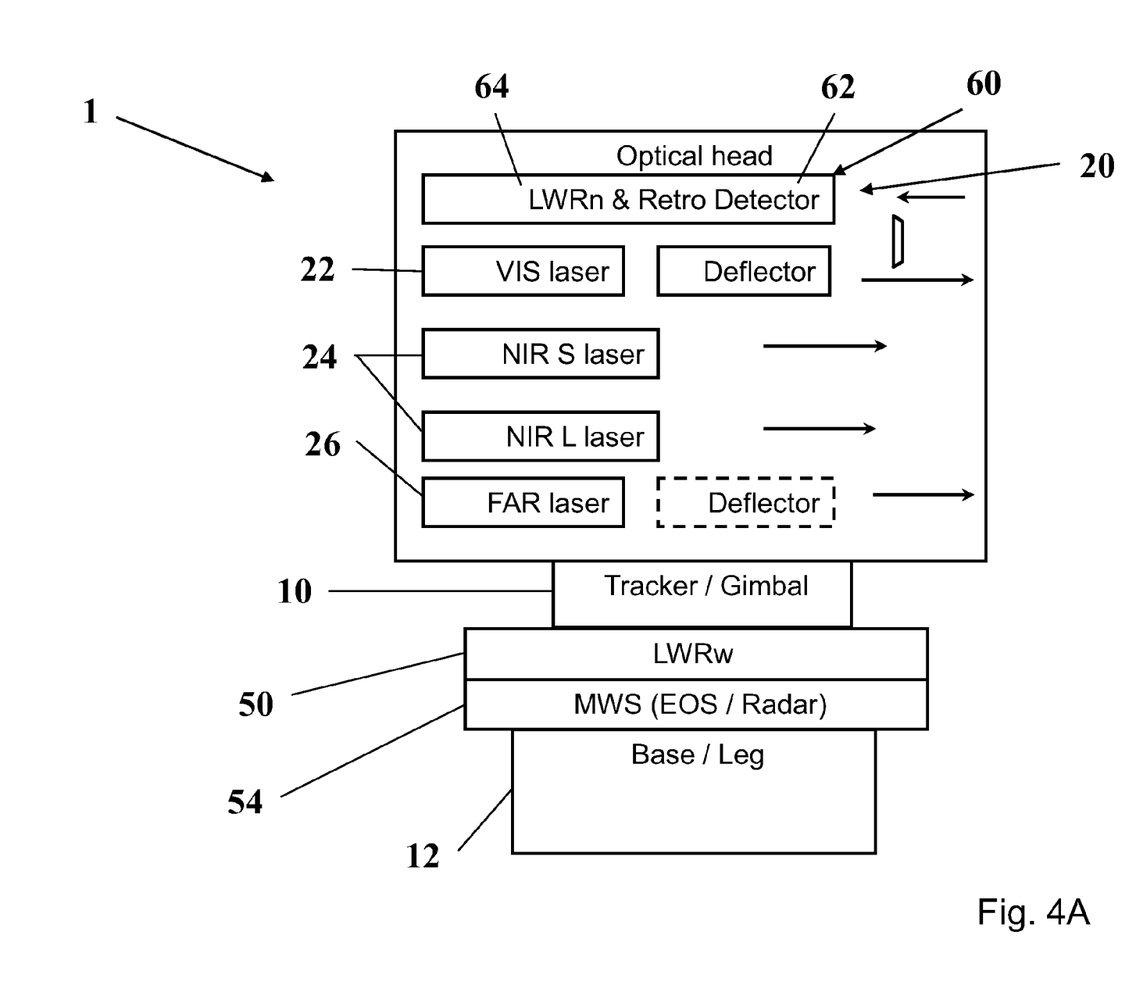
FIG. 4A is a schematic block diagram of the countermeasure system of FIG. 1A.
Figure 4B:
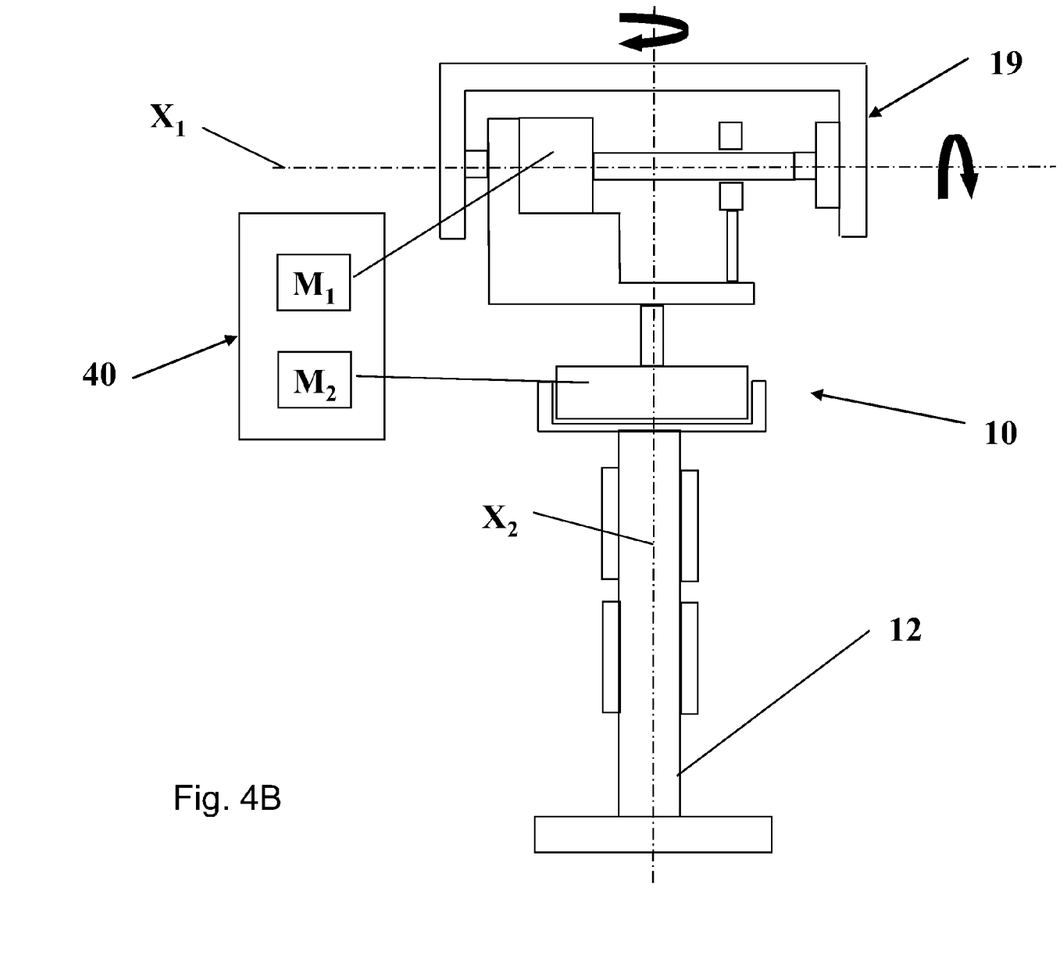
FIG. 4B is a schematic illustration of a driving arrangement of the gimbal shown in FIG. 4A.

Attention is now drawn to FIGS. 4A and 4B, in which a schematic representation of the system 1 is shown. In particular, it is observed that the base of the system 1 is constituted by a gimbal 10 positioned on a leg 12.

At the base of the gimbal 10 there is located the wide sensor 50, whereas the optical head 20 of the system 1 comprises both the second narrow sensors 60 (including narrow LWRn 62 and narrow Radar 65, a narrow thermal camera 66 or other narrow electro optical sensors 67) as well as the illumination sources NIR 22, VIS 24 and FIR 26.

It is appreciated that in the configuration shown in FIGS. 4A and 4B, the entire illumination system 20 as well as the narrow sensor 60 is configured for being revolved by the gimbal 10, while the wide sensor 50 can remain stationary. Specifically, the optical head 20 is configured for being fitted to a gimbal platform 19 via frame 29 (shown in FIG. 5B), thereby allowing rotation of the optical head 20 in the direction mentioned above.

Figure 5A:
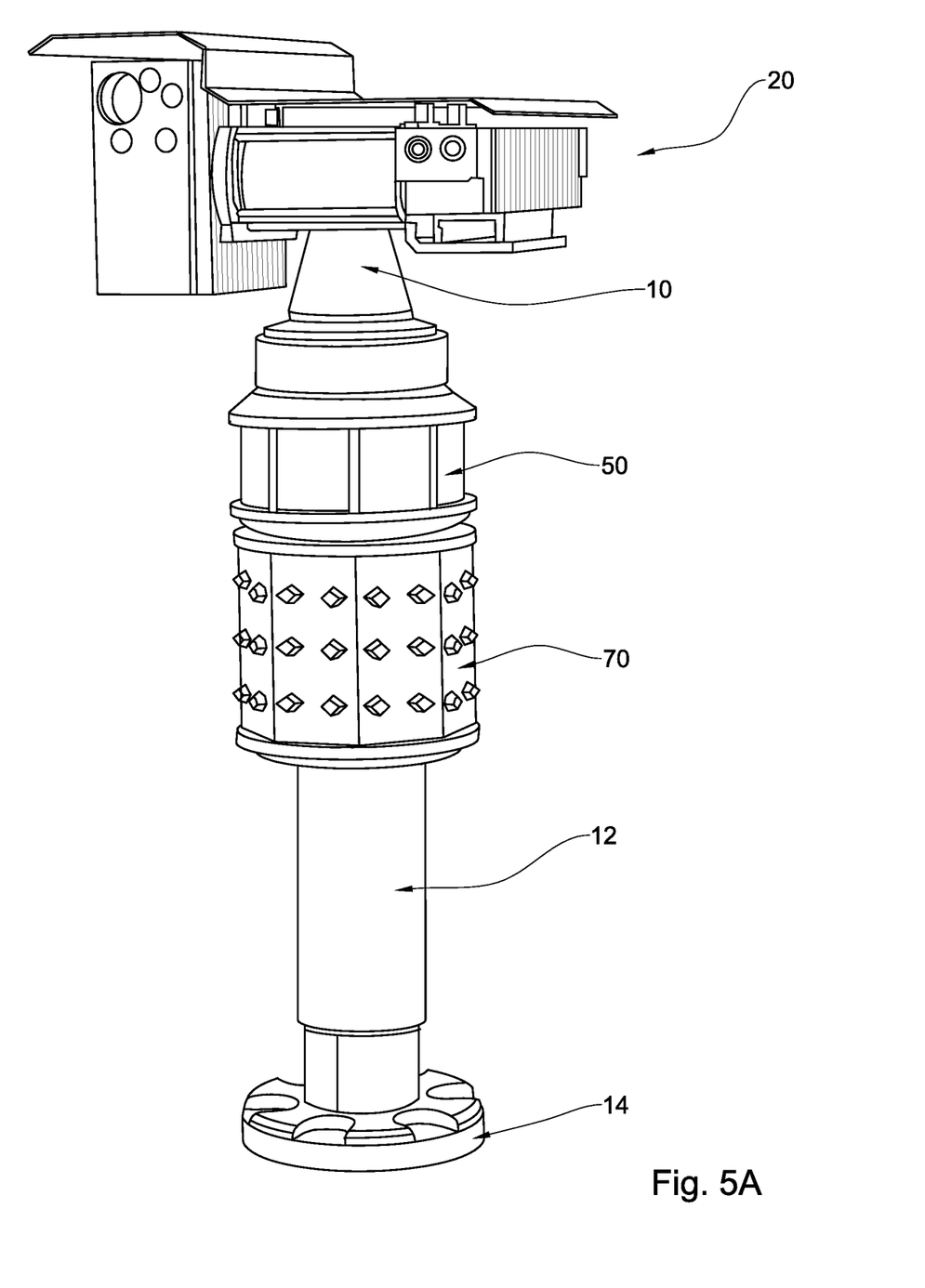
FIG. 5A is a schematic isometric view of the countermeasure system shown in FIG. 3A.
Figure 5B:
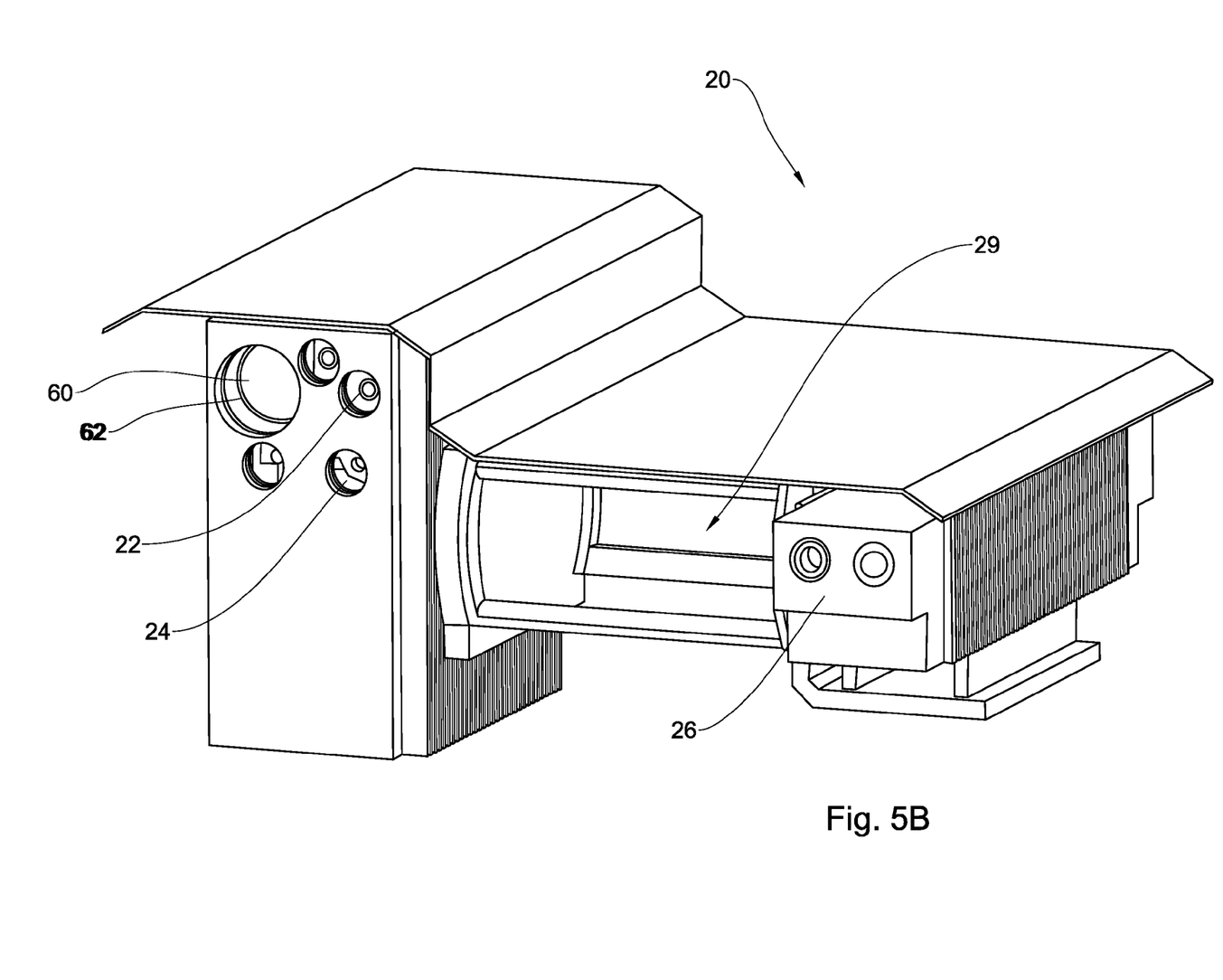
FIG. 5B is a schematic isometric view of an optical head used in the countermeasure system shown in FIG. 3B.
Figure 6:
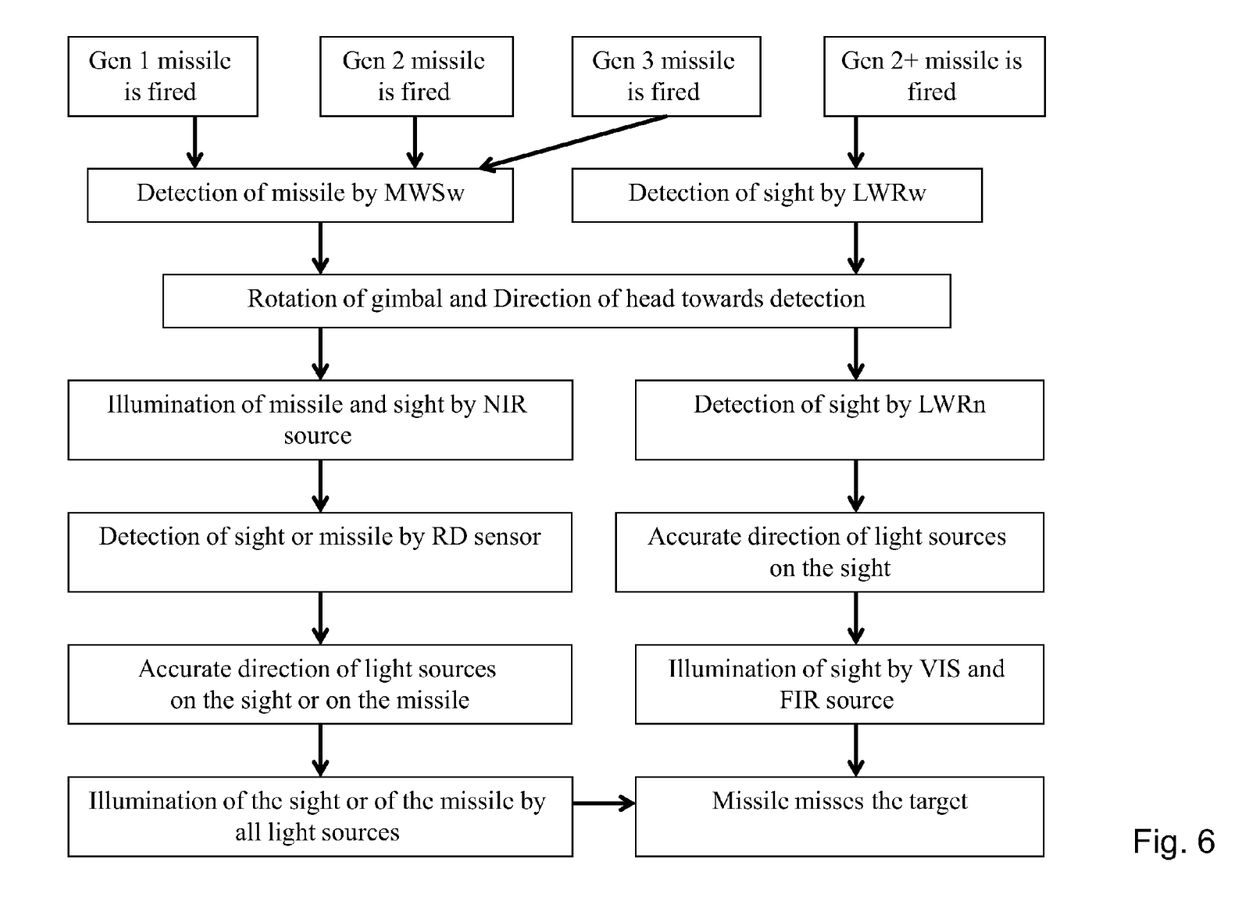
FIG. 6 is a schematic block diagram of the operation of the countermeasure system shown in FIGS. 1A to 3C.

A more specific illustration is provided in FIGS. 5A and 5B, in which the construction of the system 1 is shown. In particular, it is observed that the system 1 is configured for attachment to a station or target via a base platform attachment 14, located at the base of the leg 12.

It is noted that since the system 1 is mounted on a base platform, it can further include shock absorbers or dampeners configured for protecting the system, when mounted on the base platform, from mechanical and other damage during displacement of the platform. In particular, the arrangement can be such that the shock absorbers/dampeners have an angular degree of freedom about the axis of rotation of the gimbal chosen not to be greater than at least one of the following:

the angular extension of the first angular zone; and
the FOV of the second sensor.

Turning now to FIG. 5B, it is observed that the optical head 20 is constructed such that the second sensor 60 including retro detector 64 are positioned on one side of the optical head 20 together with the NIR and VIS illumination sources, while the FIR illumination source is located on an opposite side of the optical head 20, but still facing the same direction (towards an intended threat).

It is noted that separation of illumination sources 22, 24, 26 prevents overlap of output light beams at short distances. It improves laser safety via reduction of possibility of simultaneous exposure of humans with multiple illumination sources. Taking into account that the Geneva Convention prohibits permanent damage to an enemy eyesight, separation of the light source also allows convenient conforming to the Geneva convention.

Another reason for placement of illumination sources 22, 24, 26 and second sensor 60 at two opposite sides of optical head 20 is to provide a place for attachment of gimbal 10 at the center of optical head. This way the optical head can be balanced with respect to center of gimbal, thus providing for fast and accurate positioning of the optical head.

Finally, attention is drawn to FIG. 4, in which a block diagram of the operation of the system 1 is shown. Specifically, the system 1 is, at least at first, has no way of determining which sort of threat is launched towards it. Therefore, all sources of illumination are used, until the system detects a certain effect on the incoming threat.

It is also appreciated that if not change in the progression of the threat is detected, the system 1 is configured for indicating to an operator that the incoming threat is one which the system is, at least partially, unable to handle (for various reasons), thereby alerting the operator for performing one of the following:

if the target is at rest—to change its position with respect to the threat; and
if the target is in motion—to perform at least one of the following:
change its course of motion; and
stop moving.

The invention claimed is:

1. A countermeasure system for protecting a target against a threat of a certain type, said countermeasure system comprising:
a sensing system including at least a first sensor configured for detecting a threat within a wide-angle sector and configured for producing a first directional signal indicative of a first angular zone of location of said threat, and a second sensor configured for detecting said threat within a narrow-angle sector narrower than said wide angle sector, and configured for producing a second directional signal indicative of a second angular zone of location of said threat, said second angular zone being narrower than said first angular zone;

an illumination source configured for emitting an illumination beam capable of neutralizing a threat of said type;

a control arrangement operative for receiving said first and said second directional signal from said first and said second sensors, respectively, and for outputting corresponding first and second tracking signals;

a drive arrangement controllable by said control arrangement, and operative for moving said second sensor in response to said first tracking signal so as orient said second sensor to face towards said first angular zone, and beam directing means for directing said illumination beam from the illumination source towards said second angular zone based on said second tracking signal.

2. The countermeasure system according to claim 1, wherein the system further comprises a gimbal carrying said second sensor.

3. The countermeasure system according to claim 1, wherein said system further comprises said beam directing means and constituting at least a part of said drive arrangement for at least one of the following:
the second sensor; or
at least a part of said beam directing means.

4. The countermeasure system according to claim 1, wherein the arrangement is such that a central axis of the second sensor and an optical axis of said illumination beam along which it is emitted from the system are oriented towards one area remote from said countermeasure system, the gimbal being rotatable about at least one rotary axis thereof so as to ensure that said area coincides with said second angular zone.

5. The countermeasure system according to claim 4, wherein the arrangement is such that once the second sensor is directed towards the first angular zone based on said first tracking signal, the operative direction of the illumination beam is already facing in the proper direction for affecting the threat.

6. The countermeasure system according to claim 1, wherein the illumination source and/or the beam directing means are movably mounted onto the gimbal and are configured for being displaced/rotated with respect to the gimbal by the drive arrangement.

7. The countermeasure system according to claim 1, wherein the beam directing means of the countermeasure system comprise at least a beam orientation device configured for directional deflection of the beam produced by the illumination source towards said threat.

8. The countermeasure system according to claim 7, wherein the beam orientation device is configured for being placed/rotated/manipulated based on said second tracking signal so that the direction beam impinging thereon is deflected towards the second angular zone and the incoming threat.

9. The countermeasure system according to claim 2, wherein the first sensor is mounted on one of the following:
a platform separately from the gimbal;
on the gimbal; or
a location external to the remainder of the countermeasure system and the platform.

10. The countermeasure system according to claim 1, the first sensor is configured and/or movable so that the wide-angle sector thereof has angular extension $X_1$ in the range $0<X_1 \leq 360°$ and the first angular zone established by the first sensor has an angular extension $X_{Z1}$ up to $0.5X_1$.

11. The countermeasure system according to claim 10, wherein said first sensor is configured for being rotatable about an axis parallel to or coinciding with the rotary axis of a gimbal, thereby allowing the first sensor's rotary scanning of the surrounding space.

12. The countermeasure system according to claim 1, wherein the second sensor is selected so that its narrow angle sector has an angular extension $X_2$ that is at least not smaller than that of the first angular zone, i.e. $X_2 \geq X_{Z1}$, the relation between $X_2$ and $X_{Z1}$ being $X_2 \geq 1.1 X_{Z1}$.

13. The countermeasure system according to claim 1, wherein when the first sensor determines within its field of view the first angular zone, in which the threat has been detected, moving the second sensor based on the first tracking signal such as to align the central axis of the narrow sector thereof with that of the first angular zone determined by the first sensor, inevitably results in the second sensor's narrow sector including the threat therein.

14. The countermeasure system according to claim 1, wherein the system further includes shock absorbers or dampeners configured for protecting the system, when mounted on a base platform, from mechanical and other damage during displacement of the platform, the shock absorbers or dampeners having an angular degree of freedom about the axis of rotation of a gimbal chosen not to be greater than at least one of the following:
the angular extension of said first angular zone; or
the angular extension of the narrow angle sector of said second sensor.

15. The countermeasure system according to claim 1, wherein said first sensor is a wide warning receiver of at least one of the following:
a wide laser warning receiver ($LWR_W$) which is a radar or an electrooptic system EOS including at least one of the following: a bolometric sensor, a UV sensor, a VIS sensor, a NIR sensor, a TV camera, an IR senor, a SWIR sensor, a position sensitive device, or a matrix of photodiodes; or
a wide missile warning system ($MWS_W$).

16. The countermeasure system according to claim 1, wherein said second sensor is at least one of the following:
a narrow laser warning receiver—$NLWR_N$;
a narrow radar, or
a narrow EOS including at least one of the following: a bolometric sensor, a UV sensor, a VIS sensor, a NIR sensor, a TV camera, an IR senor, a SWIR sensor, a position sensitive device, or a matrix of photodiodes.

17. The countermeasure system according to claim 1, wherein the illumination source is configured to include a plurality of illumination emitting devices, each of which can be any one or more of the following: an NIR illuminator, an VIS illuminator, an FIR illuminator, a gas laser, a solid state laser, a semiconductor laser, a fiber laser, a fiber coupled laser, a quantum cascade laser, an optically pumped semiconductor laser, an optical parametric oscillator, a second harmonic generator, a frequency doubler, a dye laser, a Raman laser, a illumination emitting diode, or a lamp.

18. The countermeasure system according to claim 1, wherein said illumination source is configured to include devices for emitting illumination at visible, near infrared and far infrared parts of optical spectrum, all these devices can be operated simultaneously for emitting radiation in several parts of the spectrum at the same time.

19. The countermeasure system according to claim 1, wherein said directional beam is configured for being directed to at least one of the following:
the threat itself; or
a sight of the threat.

20. A method for protecting a target against a threat by a countermeasure system, the method comprising:
- (a) detecting, using a first sensor, a wide angular zone indicative of an approximate location of said threat;
- (b) outputting to a control arrangement a first directional signal indicative of said wide angular zone;
- (c) providing, by the control arrangement, a first tracking signal to a drive arrangement corresponding to said first directional signal;
- (d) directing a second sensor towards said wide angular zone based on said first tracking signal;
- (e) detecting, using said second sensor, a narrow angular zone indicative of more accurate location of said threat, said narrow angular zone being narrower than said wide angular zone;
- (f) outputting to the control arrangement a second directional signal corresponding to said narrow angular zone;
- (g) providing, by the control arrangement, a second tracking signal to the drive arrangement corresponding to said second directional signal; and
- (h) directing, based on said second tracking signal, said illumination beam towards said narrow angular zone to affect the threat.

21. The method according to claim 20, wherein in step (d), if a central axis of the second sensor is aligned with optical axis of the illumination beam, performing step (d) results in bringing said illumination source in close proximity with direction towards said threat.

22. The method according to claim 20, wherein step (h) is performed by one of the following:
- (h1) if the illumination source is fixedly mounted onto said gimbal, revolving the gimbal about at least one of its axes;
- (h2) if the illumination source is movable with respect to the gimbal, revolving the illumination source with respect to the gimbal; or
- (h3) if the countermeasure comprises a beam orientation device, displacing the device.

* * * * *